United States Patent Office 2,956,058
Patented Oct. 11, 1960

2,956,058

NOVEL SUBSTITUTED PIPERIDINES AND PYRROLIDINES

Edwin R. Shepard and Dwight E. Morrison, Indianapolis, Ind., assignors to Eli Lilly and Company, Indianapolis, Ind., a corporation of Indiana No Drawing. Filed Aug. 19, 1957, Ser. No. 679,067

6 Claims. (Cl. 260—294.3)

This invention relates to novel substituted phenethylpiperidines and pyrrolidines. More particularly it relates to substituted N-phenethylpiperidines and pyrrolidines having aryl and alkyl substituents in the heterocyclic ring.

The novel piperidines and pyrrolidines provided by this invention are represented by the following formula:

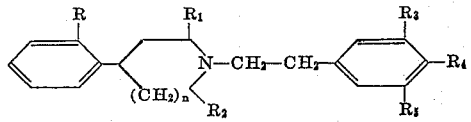

wherein $n$ is 0 or 1, R is hydrogen, methyl or methoxy, $R_1$ and $R_2$ are hydrogen or lower alkyl having from 1 to 3 carbon atoms, and $R_3$, $R_4$ and $R_5$ are members of the group consisting of hydrogen, hydroxy and alkoxy, alkylenedioxy and alkanoyloxy having from 1 to 4 carbon atoms, not more than two of $R_3$, $R_4$ and $R_5$ being hydrogen. In the above formula $R_3$, $R_4$ and $R_5$ can be illustratively, methoxy, ethoxy, isopropoxy, propionoxy, acetoxy, butyroxy and when $R_3$ and $R_4$ or $R_4$ and $R_5$ are taken together, a methylenedioxy or ethylenedioxy group.

Also included in this invention are the acid addition salts of compounds coming within the scope of the above formula, said salts being formed with pharmaceutically acceptable acids.

Illustrative compounds provided by this invention include:

1-homoveratryl-2-ethyl-4-phenylpiperidine,
1-homoveratryl-2,6-dimethyl - 4 - phenylpiperidine hydrochloride,
1-homovanillyl-2-methyl-4-o-tolylpiperidine sulfate,
1-(3-butyroxy-4-methoxyphenethyl)-2-methyl-4-phenylpiperidine tartrate,
1-(3,4 - dipropionoxyphenethyl)-4-phenylpiperidine maleate,
1-(3,5-dimethoxyphenethyl)-4-(o-anisyl)-piperidine,
1-[β-(4-anisylethyl)]-3-phenylpyrrolidine and
1-(3,4 - methylenedioxyphenethyl) - 3 - phenylpyrrolidine succinate.

The novel compounds provided by this invention are active pharmacologically as phenotropic agents and can be employed in mammals as neurosedatives. The compounds also display a degree of hypotensive and antiemetic activity. For therapeutic administration the compounds in the form of the base or as a pharmaceutically acceptable acid addition salt, can be compounded into the various pharmaceutical forms commonly employed in medicine, such as tablets, capsules, solutions and elixirs. Ordinarily, an acid addition salt is employed instead of the free base in the various pharmaceutical forms for reasons of increased solubility and stability, decreased volatility and general ease of compounding.

The pharmaceutically acceptable acids which form salts with one of the above piperidine or pyrrolidine compounds are those which do not markedly increase the toxicity of the salt over that of the free base. Among the pharmaceutically acceptable acids which can be employed for this purpose are inorganic acids such as hydrochloric, hydrobromic, sulfuric, and phosphoric acid, and the like, and organic acids such as maleic, benzoic, succinic, and tartaric acid and the like.

The acid addition salts of the free bases disclosed in this invention are for the most part white crystalline solids melting at about 100° C. The free bases from which they are derived are high boiling viscous oils, or low melting crystalline solids having a typical amine order.

In general, the piperidines and pyrrolidines of this invention are prepared by condensing an appropriately substituted α, ε- or α,δ-di-substituted alkane with a suitable β-phenylethylamine. The α,ε- or α,δ-substituents in the alkane chain must of necessity be highly reactive functional groups which are capable of condensing with a primary amine to form the particular heterocyclic ring. Among the reactive functional groups which can be present in the said positions of the alkane chain are carboxylic acid groups, halides, aldehydes, ketones, esters and the like. More specifically, a piperidine coming within the scope of this invention can be prepared by condensing homoveratrylamine with a compound such as 1,5-dichloro-3-phenylpentane, diethyl β-phenyl glutarate, ethyl β-phenyl-γ-cyanobutyrate, β-phenyl glutaric acid, or a like compound. The resulting α-ketopiperidone or α,α'-diketopiperidone is then reduced, as with lithium aluminum hydride, to the corresponding piperidine.

Similarly, a pyrrolidine coming within the scope of this invention can be prepared by reacting ethyl β-phenyl-β-cyanopropionate, diethyl-α-phenylsuccinate, α-phenylsuccindialdehyde, α-phenylsuccinic acid, or a like compound, with 3-methoxyphenethylamine to yield a substituted α-keto or α,α'-diketopyrrolidone. As with the piperidones referred to above, reduction of the pyrrolidone yields the desired substituted pyrrolidine.

Compounds having substituents in the α-position of the piperidine ring are obtained by employing a compound such as β-phenyl-δ-ketocaproic acid, or 4-phenylheptan-2,6-dione or ethyl β-phenyl-δ-ketoenanthate in place of the diethyl β-phenylglutarate or its equivalent as illustrated in the above example. 3-phenyl hexan-2,5-dione can be employed in place of ethyl β-phenyl β-cyanopropionate, if it is desirable to prepare a di-α-substituted pyrrolidine.

In general, the reductive condensations employ only alkoxy or aralkoxy substituted phenethylamines. The corresponding phenolic derivatives of the 1-substituted phenethylpiperidines or pyrrolidines are prepared by removing the alkoxy or aralkoxy group with an ether splitting reagent, such as 48% hydrobromic acid. The corresponding alkylcarbacyl derivatives are prepared from the phenols by conventional acylation procedures.

As noted above, one of the reactants in the above syntheses is a phenylethylamine. Numerous substituted phenethylamines are known, and methods for preparing them are readily available. A suitable method of preparing substituted phenethylamines comprises the reaction in an inert solvent of a substituted benzaldehyde with nitromethane to form the corresponding ω-nitrostyrene which compound is then reduced catalytically or chemically to yield the desired substituted β-phenylethylamine.

An alternative procedure which can be employed to synthesize the piperidine compounds of this invention, is to prepare an N-β-substituted phenylethyl-γ-piperidone, react this compound with a phenyl Grignard reagent, dehydrate the resulting alcohol, and hydrogenate the unsaturated compound to a piperidine. An additional method of synthesis which can be employed, is the preparation of a β-phenylpyrrolidine or a γ-phenylpiperidine and alkylate this compound on the ring nitrogen with the appropriately substituted β-phenylethylhalide or to acylate either of the same two compounds with the appropriately substituted phenylacetylhalide (or anhydride) followed by reduction of the thus-formed amide with lithium aluminum hydride. The γ-phenylpiperidines and β-phenylpyrrolidines having no nitrogen substitutent can be prepared by substituting ammonia for the β-substituted phenethylamine in the synthesis previously discussed. As is known, those piperidines or pyrrolidines which contain substituents on each of two carbon atoms in the ring, as for example, 2-methyl-4-phenylpiperidine or 2-methyl-3-phenylpyrrolidine, possess two asymmetric centers thus giving rise to two diastereoisomeric pairs capable of resolution into d- and l- optical isomers. In the examples to follow, the first diastereoisomeric pair to crystallize is arbitrarily called the α-dl pair and the second is called the β-dl pair.

This invention is further illustrated by the following specific examples.

EXAMPLE 1

*Preparation of α-dl-1-homoveratryl-2-methyl-4-phenylpiperidine*

A mixture of 25 g. of β-phenyl-δ-ketocaproic acid, 64 g. of homoveratrylamine, and 200 ml. of absolute ethanol was placed in a high pressure hydrogenation bomb. About 30 g. of a heavy suspension of Raney nickel were added, and the reaction mixture was subjected to a hydrogen pressure of about 35 atmospheres at a temperature of about 45–50° C. for a period of about 48 hours. After the conclusion of the hydrogenation, the reaction mixture was filtered to remove the catalyst and the filtrate was evaporated to dryness in vacuo. The residue was dissolved in benzene and the solution was again evaporated to dryness in vacuo. The solution and evaporation steps were repeated three times to remove all traces of alcoholic solvent. The amorphous residue remaining in the flask which comprised a mixture of the diastereoisomers of 1-homoveratryl-2-methyl-4-phenylpiperidone-6 was triturated with a small amount of distilled water, whereupon the material crystallized. The crystalline material was isolated by filtration, and was recrystallized by solution in about 200 ml. of boiling methanol, decolorizing the solution, diluting the hot filtrate with distilled water to the point of incipient crystallization of the piperidone and cooling the solution to about 0° C. for about 24 hours. The crystalline product which separated was isolated by filtration. Two further recrystallizations were carried out following the same procedure. The α-dl-1-homoveratryl-2-methyl-4-phenylpiperidone-6 thus purified melted at about 138.5–140° C.

*Analysis.*—Calculated: C, 74.76; H, 7.70; N, 3.96; Found: C, 74.90; H, 8.07; N, 3.87.

11.5 g. of a mixture of the diastereoisomers of 1-homoveratryl-2-methyl-4-phenylpiperidone-6 obtained as above were dissolved in about 85 ml. of anhydrous benzene, and the solution was added in small portions to a suspension of 2.5 g. of lithium aluminum hydride in 100 ml. of anhydrous ether. After the addition had been completed, the reaction mixture was stirred at refluxing temperature for about four hours to insure more nearly complete formation of 1-homoveratryl-2-methyl-4-phenylpiperidine by reduction of the piperidone. The reaction mixture was then cooled to about 0° C. and the organometallic complexes contained therein were decomposed by the successive addition of 3 ml. of water, 3 ml. of 15% sodium hydroxide and 9 ml. of water. The decomposed reaction mixture was filtered, and the filter cake which contained predominantly inorganic salts was washed with 50 ml. of hot benzene. The combined filtrate and washings containing 1-homoveratryl-2-methyl-4-phenylpiperidine were dried, and were saturated with dry hydrogen chloride gas. The mixture was maintained at about 0° C. for 16 hours during which time crystalline α-dl-1-homoveratryl-2-methyl-4-phenylpiperidine hydrochloride precipitated from the solution. The precipitate was separated by filtration, and was dissolved in about 500 ml. of boiling anhydrous ethanol. The solution was decolorized with activated charcoal, was filtered and the filtrate was cooled at about 0° C. for 16 hours, yielding crystals of the piperidine hydrochloride. Twofold recrystallization from the same solvent yielded purified α-dl-1-homoveratryl-2-methyl-4-phenylpiperidine hydrochloride which melted with decomposition at about 239–240° C.

*Analysis.*—Calculated: C, 70.28; H, 8.04; N, 3.73. Found: C, 69.49; H, 8.28; N, 3.75.

The mother liquors from the initial crystallization of α-dl-1-homoveratryl-2-methyl-4-phenylpiperidine hydrochloride were concentrated and were cooled to yield a second crystalline material which was the other diastereoisomeric pair and was designated as β-dl-1-homoveratryl-2-methyl-4-phenylpiperidine hydrochloride. The crystalline material was separated by filtration. Recrystallization of the filter cake from a mixture of anhydrous ethanol and diethylether followed by recrystallization from anhydrous ethanol alone yielded β-dl-1-homoveratryl-2-methyl-4-phenylpiperidine hydrochloride melting at about 218–220° C. Further recrystallization from a mixture of methanol and ethylacetate yielded a product melting at about 230–231° C.

*Analysis.*—Calculated: C, 70.28; H, 8.04; N, 3.73; Cl, 9.43. Found: C, 70.45; H, 7.97; N, 3.60; Cl, 9.36.

EXAMPLE 2

*Preparation of α-dl-1-(4-methoxyphenethyl)-2-methyl-4-phenylpiperidine*

Following the procedure of Example 1, β-phenyl-δ-ketocaproic acid and 4-methoxyphenethylamine were condensed under reducing conditions to yield 1-(4-methoxyphenethyl)-2-methyl-4-phenylpiperidone-6. This compound was reduced with lithium aluminum hydride following the procedure of Example 1 to yield α-dl-1-(4-methoxyphenethyl)-2-methyl-4-phenylpiperidine hydrochloride which melted at about 210.5–211.5° C. after threefold recrystallization from anhydrous ethanol.

*Analysis.*—Calculated: C, 72.91; H, 8.16; N, 4.05. Found: C, 72.96; H, 8.31; N, 3.93.

EXAMPLE 3

*Preparation of α-dl-1-homopiperonyl-2-methyl-4-phenylpiperidine*

Following the procedure of Example 1, β-phenyl-δ-ketocaproic acid and homopiperonylamine were reductively condensed to yield 1-homopiperonyl-2-methyl-4-phenylpiperidone-6. This compound was reduced and purified by the procedure of Example 1 to yield α-dl-1-homopiperonyl-2-methyl-4-phenylpiperidine hydrochloride melting at about 181.5–182.5° C.

*Analysis.*—Calculated: C, 70.08; H, 7.28; N, 3.89. Found: C, 69.94; H, 7.36; N, 3.83.

EXAMPLE 4

*Preparation of α-dl-1-(3-methoxyphenethyl)-2-methyl-4-phenylpiperidine*

Following the procedure of Example 1, β-phenyl-δ-ketocaproic acid and 3-methoxyphenylethylamine were reductively condensed to yield 1-(3-methoxyphenethyl)-2-methyl-4-phenylpiperidone-6. This compound was reduced with lithium aluminum hydride by the procedure of Example 1 to yield α-dl-1-(3-methoxyphenethyl)-2-methyl-4-phenylpiperidine hydrochloride which was purified by fourfold recrystallization from a mixture of anhydrous ethanol and ether, and one recrystallization from anhydrous ethanol. The purified material melted at about 146–148° C.

*Analysis.*—Calculated: C, 72.91; H, 8.16; N, 4.05. Found: C, 73.19; H, 8.41; N, 3.96.

EXAMPLE 5

*Preparation of α-dl-1-homovanillyl-2-methyl-4-phenylpiperidine*

Following the procedure of Example 1, β-phenyl-δ-keto-caproic acid and 3-methoxy-4-benzyloxyphenethylamine were reductively condensed to yield 1-(3-methoxy-4 - benzyloxyphenethyl) - 2 - methyl - 4 - phenylpiperidone-6. The compound was reduced and purified by the method of Example 1 to yield 1-(3-methoxy-4-benzyloxyphenethyl) - 2 - methyl - 4 - phenylpiperidine hydrochloride melting at about 209–212° C.

*Analysis.*—Calculated: C, 74.39; H, 7.58; N, 3.10. Found: C, 74.18; H, 7.64; N, 2.99.

1 - (3 - methoxy - 4 - benzyloxyphenethyl) - 2 - methyl-4-phenylpiperidine hydrochloride prepared as above was dissolved in a solvent mixture containing 100 ml. of ethanol and 100 ml. of distilled water. About 3 g. of palladium-on-carbon were added and the mixture was hydrogenated at a pressure of about 3 atmospheres until one molecular equivalent of hydrogen was absorbed. This reduction served to remove the benzyl group, thus yielding 1-homovanillyl-2-methyl-4-phenylpiperidine hydrochloride. After the reduction had been completed, the catalyst was removed by filtration, and the filtrate was evaporated to dryness, yielding a white solid residue comprising 1-homovanillyl-2-methyl-4-phenylpiperidine hydrochloride. The residue was dried by adding benzene thereto and boiling off the benzene and benzene-water azeotrope. The dried residue comprising a mixture of both α-dl- and β-dl-1-homovanillyl-2-methyl-4-phenylpiperidine hydrochloride was separated into pure α - dl - 1 - homovanillyl - 2 - methyl - 4 - phenylpiperidine hydrochloride melting at about 224–225° C. and pure β-dl-1-homovanillyl-2-methyl-4-phenylpiperidine hydrochloride melting at 238–239° C. by fractional crystallization, using ethanol or mixtures of methanol and ethyl acetate as recrystallization solvents.

α-dl-1-homovanillyl-2-methyl-4-phenylpiperidine hydrochloride was converted to the corresponding free base by treatment with alkali. The base was acetylated by the method of Example 11 except that the hydrochloride was used in place of the free base of that example. After being recrystallized three times from a methanol-ethyl acetate solvent mixture, α-dl-1-(3-methoxy-4-acetoxyphenethyl)-2-methyl-4-phenylpiperidine hydrochloride melted at about 239–240° C.

EXAMPLE 6

*Preparation of 1-homoveratryl-4-phenylpiperidine*

N-homoveratryl β-phenyl glutarimide was prepared by the general procedure of Mallard and Wilson described in J. Am. Pharm. Assoc., Sci. Ed., XI III 246 (1954).

38 g. of β-phenylglutaric anhydride and 36.2 g. of homoveratrylamine were dissolved in about 150 ml. of anhydrous o-xylene. The solution was placed in a 500 ml. round bottom flask equipped with a Dean-Stark water separator and was refluxed until the reaction had gone to completion as evidenced by the collection of 3.6 ml. of water in the water separator. This amount of water was about the theoretical quantity expected to be produced by the reaction. The product of this reaction, N-homoveratryl β-phenylglutarimide, was isolated as follows: The reaction mixture was cooled yielding a solid mass which was dissolved in hot toluene. The solution was decolorized with activated carbon and filtered. The decolorized solution was cooled for about 16 hours at 0° C. Solid N-homoveratryl β-phenylglutarimide which precipitated was collected by filtration, and was purified by recrystallizing it twice from benzene, and thrice from anhydrous ethanol. Purified N-homoveratryl β-phenylglutarimide melted at about 157–158° C.

*Analysis.*—Calculated: C, 71.37; H, 6.56; N, 3.98. Found: C, 71.23; H, 6.52; N, 3.88.

N-homoveratryl β-phenylglutarimide prepared as above was reduced with lithium aluminum hydride following the method described in Example 1 for the reduction of 1-homoveratryl-2-methyl-4-phenylpiperidone-6. The 1-homoveratryl-4-phenylpiperidine which was isolated as the hydrochloride salt was purified by recrystallization from anhydrous ethanol and melted with decomposition at about 256–258° C.

*Analysis.*—Calculated: C, 69.70; H, 7.80; N, 3.87. Found: C, 69.79; H, 7.75; N, 3.95.

EXAMPLE 7

*Preparation of 1-(3,4,5-trimethoxyphenethyl)-4-phenylpiperidine*

The procedure of Example 6 was followed except that 3,4,5-trimethoxyphenethylamine was used in place of homoveratrylamine. N - (3,4,5 - trimethoxyphenethyl)-β-phenylglutarimide prepared in this fashion melted at about 111–113.5° C. after threefold recrystallization from anhydrous ethanol.

*Analysis.*—Calculated: C, 68.91; H, 6.57; N, 3.65. Found: C, 68.83; H, 6.56; N, 3.50.

The above glutarimide was reduced with lithium aluminum hydride following the procedure of Example 1 to yield 1-(3,4,5-trimethoxyphenethyl)-4-phenylpiperidine which was isolated as its hydrochloride salt. Recrystallization of the salt from a solvent mixture containing anhydrous ethanol and anhydrous diethyl ether yielded 1-(3,4,5-trimethoxyphenethyl)-4-phenylpiperidine hydrochloride melting with decomposition at about 224–226° C.

*Analysis.*—Calculated: C, 67.42; H, 7.72; N, 3.57. Found: C, 67.59; H, 8.02; N, 3.74.

EXAMPLE 8

*Preparation of 1-homoveratryl-2-methyl-4-(o-anisyl)-piperidine*

Following the procedure of Example 1, β-(o-anisyl)-δ-ketocaproic acid and homoveratrylamine were reductively condensed to yield 1-homoveratryl-2-methyl-4-(o-anisyl)-piperidone-6. The compound was reduced, and the reduction product purified, by the method of Example 1 to yield 1-homoveratryl-2-methyl-4-(o-anisyl)-piperidine hydrochloride melting at about 212–214° C.

*Analysis.*—Calculated: C, 68.09; H, 7.95. Found: C, 68.52; H, 8.07.

EXAMPLE 9

*Preparation of 1-homoveratryl-2-methyl-4-(o-tolyl)-piperidine*

Following the procedure of Example 1, β-(o-tolyl)-δ-ketocaproic acid and homoveratrylamine were reductively condensed to yield 1-homoveratryl-2-methyl-4-(o-tolyl)-piperidone-6. The compound was reduced, and the reduction product purified following the procedure of Example 1 to yield 1-homoveratryl-2-methyl-4-(o-tolyl)-piperidine hydrochloride, melting at about 196–197° C.

*Analysis.*—Calculated: C, 70.80; H, 8.29. Found: C, 70.68; H, 8.46.

EXAMPLE 10

*Preparation of β-dl-1-(3,4-dihydroxyphenethyl)-2-methyl-4-phenylpiperidine*

15 g. of β-dl-1-homoveratryl-2-methyl-4-phenylpiperidine hydrochloride and 150 ml. of 48% hydrobromic acid were mixed in a 500 ml. flask equipped with a condenser. The reaction mixture was refluxed for about two hours. The gases emitted from the condenser were tested periodically for the presence of acidic gases and after evolution of acidic gases had ceased, the reaction mixture was cooled and was concentrated in vacuo to a heavy viscous oil comprising β-dl-1-(3,4-dihydroxyphenethyl)-2-methyl-4-phenylpiperidine hydrobromide. This oil was triturated with a mixture of anhydrous alcohol and benzene until solid β-dl-1-(3,4-dihydroxyphenethyl)-2-methyl-4-phenylpiperidine hydrobromide was obtained. The solid product was separated by filtration and the filter cake was dissolved in about 500 ml. of hot anhydrous alcohol. The solution was decolorized with activated charcoal, was filtered and was then cooled to about 0° C. whereupon purified β-dl-1-(3,4-dihydroxyphenethyl)-2-methyl-4-phenylpiperidine hydrobromide crystallized. It melted at about 187–189° C.

Analysis.—Calculated: C, 74.28; H, 6.55; N, 4.33. Found: C, 74.08; H, 6.77; N, 4.22.

EXAMPLE 11

Preparation of α-dl-1-(3-hydroxyphenethyl)-2-methyl-4-phenylpiperidine

The procedure of Example 10 was followed except that α-dl-1-(3-methoxyphenethyl)-2-methyl-4-phenylpiperidine hydrochloride as provided by Example 4 was used in place of the β-dl-isomeric pair. α-dl-1-(3-hydroxyphenethyl)-2-methyl-4-phenylpiperidine hydrobromide melted at about 194–196° C.

Analysis.—Calculated: C, 64.00; H, 6.98; N, 3.73. Found: C, 63.62; H, 7.37; N, 3.61.

α-dl-1-(3-hydroxyphenethyl)-2-methyl-4-phenylpiperidine hydrobromide was converted to the free base by dissolving it in water and adding solid sodium bicarbonate to the water solution. The free base was extracted with three successive 100 ml. portions of benzene. The benzene extracts were combined and were dried. The benzene was evaporated therefrom in vacuo, leaving a residue comprising α-dl-1-(3-hydroxyphenethyl)-2-methyl-4-phenylpiperidine. This residue was acetylated by dissolving it in acetic anhydride containing a drop of pyridine and refluxing the reaction mixture for about one hour. The excess acetic anhydride was removed by evaporation in vacuo. The resulting residue comprising α-dl-1-(3-acetoxyphenethyl)-2-methyl-4-phenylpiperidine was dissolved in ether and gaseous hydrogen chloride was passed into the ether solution, thus forming the hydrochloride salt. The ether supernatant was decanted from the insoluble precipitate of the hydrochloride salt, and the latter was purified by fourfold recrystallization from an anhydrous ethanol-ether solvent mixture. α-dl-1-(3-acetoxyphenethyl)-2-methyl-4-phenylpiperidine hydrochloride thus prepared melted at about 186–187° C.

Analysis.—Calculated: C, 70.66; H, 7.55; N, 3.75. Found: C, 70.41; H, 7.30; N, 3.53.

EXAMPLE 12

Preparation of α-dl-1-(4-hydroxyphenethyl)-2-methyl-4-phenylpiperidine

The procedure of Example 10 was followed except that α-dl-1-(4-methoxyphenethyl)-2-methyl-4-phenylpiperidine hydrochloride as provided by Example 2 was used in place of β-dl-1-3,4-dimethoxyphenethyl-2-methyl-4-phenylpiperidine hydrochloride. α-dl-1-(4-hydroxyphenethyl)-2-methyl-4-phenylpiperidine hydrobromide melted at about 264–266° C.

Analysis.—Calculated: C, 64.00; H, 6.98; N, 3.73. Found: C, 63.83; H, 7.23; N, 3.58.

α-dl-1-(4-hydroxyphenethyl)-2-methyl-4-phenylpiperidine hydrobromide was converted to the free base. The base was acetylated and the acetate derivative was isolated as the hydrochloride salt according to the procedure described in Example 11. α-dl-1-(4-acetoxyphenethyl)-2-methyl-4-phenylpiperidine hydrochloride thus prepared melted at about 157–159° C. after twofold recrystallization from an anhydrous ethanol-ether solvent mixture.

Analysis.—Calculated: C, 70.66; H, 7.55; N, 3.75. Found: C, 70.45; H, 7.71; N, 3.65.

EXAMPLE 13

Preparation of α-dl-1-isohomovanillyl-2-methyl-4-phenylpiperidine

The procedure of Example 5 was followed except that 3-benzyloxy-4-methoxyphenylethylamine was used in place of the 3-methoxy-4-benzyloxyphenylethylamine of that example. α-dl-1-isohomovanillyl-2-methyl-4-phenylpiperidine hydrochloride thus prepared melted at about 227.5–229.5° C. after being recrystallized three times from anhydrous ethanol.

Analysis.—Calculated: C, 69.69; H, 8.24; N, 3.87. Found: C, 69.24; H, 8.16; N, 3.80.

EXAMPLE 14

Preparation of α-dl-1-(4-methoxyphenethyl)-4-phenylpiperidine

Following the procedure of Example 6, β-phenyl glutaric acid and 4-methoxyphenethylamine were reacted to form N-(4-methoxyphenethyl)-β-phenylglutarimide which melted at about 143–145° C. after being recrystallized three times from hot anhydrous ethanol.

Analysis.—Calculated: C, 74.28; H, 6.55; N, 4.33. Found: C, 74.08; H, 6.77; N, 4.22.

Following the procedure of Example 1, the above compound was reduced with lithium aluminum hydride to yield α-dl-1-(4-methoxyphenethyl)-4-phenylpiperidine hydrochloride which, after recrystallization from anhydrous ethanol, melted with decomposition at about 265–267° C.

Analysis.—Calculated: C, 72.38; H, 7.90; N, 4.22. Found: C, 72.06; H, 7.71; N, 4.32.

EXAMPLE 15

Preparation of 1-homoveratryl-2,6-dimethyl-4-phenylpiperidine 17.65 g. of 1-homoveratryl-2-methyl-4-phenylpiperidone-6 prepared as described in Example 1 was dissolved in a mixture of about 300 ml. of ether and 500 ml. of anhydrous benzene. This solution was added to a Grignard reagent prepared from 7.09 g. of methyl iodide, 1.22 g. of magnesium and about 100 ml. of anhydrous ether. After the addition of the piperidone had been completed, the reaction mixture was heated to refluxing temperature and was stirred at that temperature for about three hours. It was then cooled, and about 50 ml. of a 10% hydrochloric acid solution was added to decompose the organo-magnesium complexes and to yield 1-homoveratryl-2,6-dimethyl-4-phenyltetrahydropyridine hydrochloride. The acid aqueous layer containing the hydrochloride salt was separated, and was saturated with solid sodium carbonate. 1-homoveratryl-2,6-dimethyl-4-phenyltetrahydropyridine was insoluble in this basic solution, and was extracted therefrom with chloroform. The chloroform solution was dried, was saturated with anhydrous hydrogen chloride gas, and was diluted with ether to a volume of about 4 l., thus precipitating 1-homoveratryl-2,6-dimethyl-4-phenyltetrahydropyridine hydrochloride. The precipitate was separated by filtration and the filter cake was recrystallized by dissolving it in about 100 ml. of anhydrous ethanol, decolorizing the solution with activated carbon, and adding anhydrous ether to reprecipitate the solid hydrochloride which was hygroscopic. This procedure was repeated twice. The tetrahydropyridine product thus isolated was converted to the free base by the procedure described in Example 11, and the free base was hydrogenated with Raney nickel catalyst suspended in anhydrous ethanol, the hydrogenation being carried out at room temperature and a hydrogen pressure of about 4 atmospheres. After the reduction had been completed, the catalyst was removed from the hydrogenation mixture by filtration and the filtrate was diluted with anhydrous ether. 1-homoveratryl-2,6-dimethyl-4-phenylpiperidine contained in this filtrate was converted to the corresponding hydrochloride salt with gaseous hydrogen chloride. The solvents were removed therefrom by evaporation in vacuo and the resulting residue comprising 1-homoveratryl-2,6-dimethyl-4-phenylpiperidine hydrochloride was recrystallized twice by dissolution in a minimum quantity of warm anhydrous ethanol, dilution to the point of incipient precipitation with anhydrous ether and cooling for 16 hours at about 0° C. Crystalline 1-homoveratryl-2,6-dimethyl-4-phenylpiperidine hydrochloride thus prepared melted at about 204–206° C.

*Analysis.*—Calculated: C, 70.83; H, 8.27; H, 3.59. Found: C, 70.60; H, 8.48; N, 3.57.

EXAMPLE 16

*Preparation of α-dl-1-(3,4-dihydroxyphenethyl)-2-methyl-4-phenylpiperidine*

The procedure of Example 10 was followed except that α - dl - 1 - (3,4 - dimethoxyphenethyl) - 2 - methyl - 4 - phenylpiperidine hydrochloride was used in place of the racemic pair of that example. α-dl-1-(3,4-dihydroxyphenethyl) - 2 - methyl-4-phenylpiperidine hydrobromide thus prepared melted at about 211.5–213.5° C. after being recrystallized three times from anhydrous ethanol.

*Analysis.*—Calculated: C, 61.22; H, 6.68; N, 3.57. Found: C, 61.23; H, 6.78; N, 3.34.

By following the procedure of Example 11, α-dl-1-(3,4-dihydroxyphenethyl)-2-methyl-4-phenylpiperidine hydrobromide was converted to the free base which was acetylated to the diacetoxy compound and the diacetate was isolated as its hydrochloride salt. After recrystallization from anhydrous ethanol, α-dl-1-(3,4-di-acetoxyphenethyl)-2-methyl-4-phenylpiperidine hydrochloride melted at about 227.5–228° C.

*Analysis.*—Calculated: C, 66.73; H, 7.00. Found: C, 66.91; H, 7.03.

EXAMPLE 17

*Preparation of α-dl-1-homoveratryl-2-ethyl-4-phenylpiperidine*

A mixture of 145.2 g. of 1-phenylpent-1-en-3-one, 108 g. of the mono-sodium salt of dimethyl malonate and 600 ml. of anhydrous methanol was refluxed for about four hours. The methanol was then evaporated in vacuo from the reaction mixture. About 500 ml. of water were added to the residue which contained the sodium salt of 1,1-dicarbomethoxy-2-phenylhexane-4-one. The addition of the water converted the sodium salt to 1,1-dicarbomethoxy-2-phenylhexane-4-one, and the latter was extracted from the water layer with three successive 500 ml. portions of ether. The ether extracts were combined and were dried. The ether was removed in vacuo from the combined extracts, and the resulting residue comprising 1,1-dicarbomethoxy-2-phenylhexane-4-one was distilled in vacuo. This compound boiled at about 187–189° C. at a pressure of 4 mm. of mercury; $n_D^{25}$=1.501.

The 1,1-dicarbomethoxy-2-phenylhexane-4-one was hydrolyzed by refluxing it with aqueous potassium hydroxide for about one hour. The hydrolysate was acidified with hydrochloric acid and the 1,1-dicarboxy-2-phenylhexane-4-one which separated was recovered by extraction of the acidified hydrolysate with 300 ml. of ether. The ether was evaporated in vacuo, and the residue consisting of the diacid was decarboxylated and converted into β-phenyl-δ-ketoenanthic acid by heating in vacuo to about 175° C. for about two hours. The enanthic acid was dissolved in an excess of saturated sodium carbonate solution and the solution was extracted with two 100 ml. portions of chloroform which were discarded. The basic aqueous layer was cooled, and acidified yielding a precipitate of β-phenyl-δ-ketoenanthic acid. The acid was recovered by filtration, and was purified by crystallizing it three times from benzene-hexane mixture. Purified β-phenyl-δ-ketoenanthic acid melted at about 93.5–95.5° C.

*Analysis.*—Calculated: C, 70.88; H, 7.32. Found: C, 71.04; H, 7.33.

β-phenyl-δ-ketoenanthic acid was condensed with homoveratrylamine by the procedure of Example 1 to yield 1-homoveratryl-2-ethyl-4-phenylpiperidone-6 which after recrystallization from anhydrous ethanol melted at about 140.5–143.5° C.

*Analysis.*—Calculated: C, 75.15; H, 7.95; N, 3.81. Found: C, 75.33; H, 7.69; N, 3.63.

By following the procedure of Example 1, 1-homoveratryl-2-ethyl-4-phenylpiperidone-6 was reduced with lithium aluminum hydride to yield α-dl-1-homoveratryl-2-ethyl-4-phenylpiperidine which was isolated as the hydrochloride salt melting at about 192–193.5° C.

*Analysis.*—Calculated: C, 70.84; H, 8.27; N, 3.59. Found: C, 70.81; H, 8.06; N, 3.36.

EXAMPLE 18

*Preparation of 1-homoveratryl-3-phenylpyrrolidine*

A mixture comprising 55 g. of 3-phenylpyrrolidine and 76.8 g. of 3,4-dimethoxyphenylacetic acid was heated at about 200° C. for about one hour thus forming N-(3,4-dimethoxyphenylacetyl)-3-phenylpyrrolidine. The crude reaction mixture was dissolved in tetrahydrofurane, and this solution was added to a suspension of 22.2 g. of lithium aluminum hydride in 1000 ml. of tetrahydrofurane. After the addition of the amide had been completed, the reaction mixture was stirred at ambient room temperature for about 48 hours. 25 ml. of ethanol, 10 ml. of water and 10 ml. of 10% sodium hydroxide were added in that order to the reaction mixture and the tetrahydrofurane layer containing 1-homoveratryl-3-phenylpyrrolidine prepared in the above reaction was separated from the alkaline layer. The solvents were removed from the organic layer by evaporation in vacuo, leaving 1-homo-veratryl-3-phenylpyrrolidine as a residue. The residue was dissolved in anhydrous ether, and the solution was saturated with anhydrous hydrogen chloride gas to form 1-homoveratryl-3-phenylpyrrolidine hydrochloride. This compound melted at about 163.5–164.5° C. after being twice decolorized and recrystallized from a mixture of ethanol and ether.

*Analysis.*—Calculated: C, 68.90; H, 7.53. Found: C, 68.92; H, 7.63.

EXAMPLE 19

*Preparation of 1-p-methoxyphenethyl-3-phenylpyrrolidine*

By following the procedure of Example 18, p-methoxyphenylacetic acid and 3-phenylpyrrolidine were condensed to form N-(methoxyphenylacetyl) 3-phenylpyrrolidine. This amide was reduced with lithium aluminum hydride to give 1-p-methoxyphenethyl-3-phenylpyrrolidine which, in the form of its hydrochloride salt, was purified by recrystallization from acetone. 1-p-methoxyphenylethyl-3-phenylpyrrolidine hydrochloride melted at about 164.5° C.

*Analysis.*—Calculated: C, 71.79; H,7.61. Found: C, 71.63; H, 7.53.

EXAMPLE 20

*Preparation of 1-homoveratryl-2-methyl-4-phenylpyrrolidine*

The method of Example 18 was followed except that 2-methyl-4-phenylpyrrolidine was used in place of 3-phenylpyrrolidine. 1-homoveratryl-2-methyl - 4 - phenylpyrrolidine was purified by distillation and boiled at about 215–220° C. at a pressure of 0.1 mm. of mercury. The fraction boiling in this range was converted to the corresponding hydrochloride salt. 1-homoveratryl-2-methyl-4-phenylpyrrolidine hydrochloride thus prepared melted at about 137–138.5° C. after being recrystallized twice from acetone.

*Analysis.*—Calculated: C, 69.69; H, 7.79. Found: C, 69.41; H, 7.88.

EXAMPLE 21

*Preparation of 1-(p-methoxyphenethyl)-2-methyl-4-phenylpyrrolidine*

Following the procedure of Example 18, 2-methyl-4-phenylpyrrolidine and p-methoxyphenylacetic acid were reacted to give the corresponding amide which was reduced with lithium aluminum hydride by the procedure described in Example 1, to yield 1-(p-methoxyphenethyl)-2-methyl-4-phenylpyrrolidine. The compound was converted to its hydrochloride salt by treating an ethereal solution of the base with anhydrous hydrogen chloride, and the salt was purified by twofold recrystallization from anhydrous ethanol. The hydrochloride salt melted at about 186–187° C.

*Analysis.*—Calculated: C, 72.37; H, 7.89. Found: C, 72.13; H, 8.09.

EXAMPLE 22

*Preparation of β-(o-anisyl)-δ-ketocaproic acid*

A solution of sodium methoxide in methanol was prepared by adding 2 g. of sodium to 400 ml. of anhydrous methanol. 135 g. of dimethylmalonate were added to the solution, thus forming the sodium salt of dimethyl malonate. 162 g. of o-methoxybenzalacetone were added to the mixture which was then shaken until spontaneous warming occurred. The mixture was then heated for about one and one half hours at 100° C. and was allowed to stand at ambient room temperature for about sixteen more hours to insure more nearly complete formation of dimethyl α-carboxy-β-(o-anisyl)-γ-acetobutyrate. The methanol was removed from the reaction mixture by evaporation in vacuo. About 200 ml. of water were added to the residue, and the aqueous mixture was extracted with three 300 ml. portions of ether to remove the dimethyl α-carboxy-β-(o-anisyl)-γ-acetobutyrate formed in the reaction. The ether extracts were dried, and the ether was removed by evaporation in vacuo. The resulting residue comprising dimethyl α-carboxy-β-(o-anisyl)-γ-acetobutyrate, was distilled in vacuo. Dimethyl α-carboxy-β-(o-anisyl)-γ-acetobutyrate boiled in the range of 185–190° C. at a pressure of about 0.5 mm. of mercury; $n_D^{25}=1.510$.

*Analysis.*—Calculated: C, 62.32; H, 6.54. Found: C, 62.66; H, 6.60.

181 g. of the above ester were added to a solution containing 82 g. of potassium hydroxide in 492 ml. of water and 164 ml. of ethanol. The reaction mixture was heated at about 100° C. until it became homogenous and the ester was saponified. About 650 ml. of water were added to the saponification mixture, and it was extracted with three 500 ml. portions of ether which were discarded. The aqueous solution was then acidified with hydrochloric acid and the resulting acidified solution was saturated with ammonium chloride and was extracted with three 500 ml. portions of diethyl ether to remove the α-(o-anisyl)-acetonylmalonic acid formed in the above reaction. The ether extracts were combined, were dried and the ether was removed in vacuo leaving α-(o-anisyl)-acetonylmalonic acid as a residue. The malonic acid was decarboxylated to β-(o-anisyl)-δ-ketocaproic acid by heating the acid to about 165–170° C. for about two hours. The β-(o-anisyl)-δ-ketocaproic acid obtained melted at about 102–103° C.

β-(o-tolyl)-δ-ketocaproic acid was prepared in an analogous fashion, using o-methylbenzalacetone in place of o-methoxybenzalacetone. Dimethyl α-carboxy-γ-acetyl-β-(o-tolyl)-butyrate formed as an intermediate boiled at about 170–175° C. at a pressure of about 0.65 mm. of mercury; $n_D^{25}=1.506$.

*Analysis.*—Calculated: C, 65.74; H, 6.90. Found: C, 65.83; H, 7.02.

EXAMPLE 23

*Preparation of α-dl- and β-dl-2-methyl-4-phenylpiperidine hydrochloride*

Following the procedure of Example 1, β-phenyl-δ-ketocaproic acid and ammonia were dissolved in ethanol, and were reductively condensed and cyclized in a high pressure hydrogenation bomb using a Raney nickel catalyst and a hydrogen pressure of 35 atmospheres. The 2-methyl-4-phenylpiperidone-6 thus formed was reduced with lithium aluminum hydride following the procedure of Example 1, and yielded a mixture of α-dl- and β-dl-2-methyl-4-phenylpiperidines which were isolated as the hydrochloride salts.

15 g. of a mixture of α-dl- and β-dl-2-methyl-4-phenylpiperidine hydrochloride prepared as above were separated by recrystallizations from a mixture of methanol and ethyl acetate, the α-dl racemic pair being obtained as a crystalline precipitate. Threefold recrystallizations of the precipitate from the same solvent mixture yielded α-dl-2-methyl-4-phenylpiperidine hydrochloride melting at about 213–214° C.

*Analysis.*—Calculated: C, 68.07; H, 8.57; Cl, 16.75. Found: C, 68.80; H, 8.64; Cl, 16.67.

The mother liquor from the initial crystallization of α-dl-2-methyl-4-phenylpiperidine hydrochloride was concentrated and the concentrate was chilled to about 0° C. Crystalline β-dl-2-methyl-4-phenylpiperidine hydrochloride which precipitated was separated by filtration. Four recrystallizations of the filter cake from a methanol-ethyl acetate mixture yielded β-dl-2-methyl-4-piperidine hydrochloride which melted at about 117–118° C.

*Analysis.*—Calculated: C, 68.07; N, 8.57; Cl. 16.75. Found: C, 67.93; N, 8.33; Cl, 16.54.

EXAMPLE 24

*Preparation of β-dl-1-homoveratryl-2-methyl-4-phenylpiperidine hydrochloride*

5.3 g. of β-dl-2-methyl-4-phenylpiperidine hydrochloride was converted to the free base by dissolving the compound in water, making the water solution alkaline with concentrated ammonium hydroxide, and extracting the water insoluble free base into ether. The ether extract containing β-dl-2-methyl-4-phenylpiperidine was dried and was evaporated to dryness yielding a residue comprising β-dl-2-methyl-4-phenylpiperidine.

The β-dl-2-methyl-4-phenylpiperidine was dissolved in 50 ml. of methanol and 6.2 g. of homoveratryl bromide and 6.3 g. of sodium bicarbonate were added to the solution. This mixture was refluxed for about three hours to form β-dl-1-homoveratryl-2-methyl-4-phenylpiperidine. The ethanol was removed in vacuo, and to the resulting residue containing the N-substituted piperidines were added about 100 ml. of water and 10 ml. of 20% sodium hydroxide. β-dl-1-homoveratryl-2-methyl-4-phenylpiperidine, which was insoluble in this mixture, was extracted with two successive 50 ml. portions of chloroform and one 100 ml. portion of ether. The combined extracts containing β-dl-1-homoveratryl-2-methyl-4-phenylpiperidine were dried, and the solvents were removed in vacuo. The residue, comprising β-dl-1-homoveratryl-2-methyl-4-phenylpiperidine, was dissolved in ether, and was converted to the corresponding hydrochloride salt by the method of Example 1. Three crystallizations of β-dl-1-homoveratryl-2-methyl-4-phenylpiperidine hydrochloride from a mixture of methanol and ethyl acetate yielded purified material melting at about 230–231° C.

EXAMPLE 25

*Preparation of α-dl-1-homoveratryl-2-methyl-4-phenylpiperidine hydrochloride*

The procedure of the Example 24 was followed except that α-dl-2-methyl-4-phenylpiperidine hydrochloride was used as a starting material in place of the β-dl-2-methyl-4-phenylpiperidine hydrochloride of that example. Three recrystallizations of α-dl-1-homoveratryl-2-methyl-4-phenylpiperidine hydrochloride thus obtained from a mixture of methanol and ethyl acetate yielded material melting at about 237–238° C.

EXAMPLE 26

*Preparation of α-dl-1-homovanillyl-2-methyl-4-phenylpiperidine hydrochloride*

5.5 g. of 4-benzyloxy-3-methoxyphenylacetic acid and 10 ml. of thionyl chloride were mixed, and the mixture was warmed at about 40° C. for about one hour, thus forming 4-benzyloxy-3-methoxyphenylacetyl chloride. The excess thionyl chloride was removed in vacuo and the residual acid chloride was dissolved in 25 ml. of benzene. This solution was added to a solution containing about 3 g. of α-dl-2-methyl-4-phenylpiperidine in 25 ml. of benzene and 50 ml. of pyridine. The solution was heated at about 100° C. for about one hour and was then cooled and allowed to stand at ambient room temperature for about 16 hours. The reaction mixture was evaporated to dryness in vacuo, and about 100 ml. each of water and of ether were added to the residue. The ethereal layer containing N-(4-benzyloxy-3-methoxyphenylacetyl) α-dl-2-methyl-4-phenylpiperidine formed in the above reaction was separated and was washed with 100 ml. portions of 10% hydrochloric acid, 10% sodium bicarbonate and water. The ether phase was dried over magnesium sulfate, and the magnesium sulfate was removed by filtration. The filtrate containing the amide formed in the above reaction was added directly to a stirred suspension of 3.8 g. of lithium aluminum hydride in 100 ml. of ether to form α-dl-1-(4-benzyloxy-3-methoxyphenethyl)-2-methyl-4-phenylpiperidine. After the addition of the amide had been completed, the reaction mixture was refluxed for about one hour, and was then decomposed by adding successively 4 ml. of water, 3 ml. of 20% sodium hydroxide and 14 ml. of water. The ether layer was separated by filtration, and the filtrate was dried. The ether was removed therefrom in vacuo leaving as a residue α-dl-1-(4-benzyloxy-3-methoxyphenethyl)-2-methyl-4-phenylpiperidine. About 200 ml. of 6 N hydrochloric acid were added to this residue, and the mixture was refluxed with stirring for six hours, thus debenzylating the compound and yielding α-dl-1-homovanillyl-2-methyl-4-phenylpiperidine hydrochloride. The reaction mixture was cooled, and the solvents were removed in vacuo leaving a red oily material as a residue. Recrystallization of the residue from a solvent mixture of methanol and ethyl acetate yielded crystalline α-dl-1-homovanillyl-2-methyl-4-phenylpiperidine hydrochloride melting at about 224–225° C.

Following the same procedure but using β-dl-2-methyl-4-phenylpiperidine in place of the α-dl-2-methyl-4-phenylpiperidine of the above procedure there was prepared β-dl-1-homovanillyl-2-methyl-4-phenylpiperidine hydrochloride melting at about 238–239° C.

Acetylation of α-dl-1-homovanillyl-2-methyl-4-phenylpiperidine hydrochloride and β-dl-1-homovanillyl-2-methyl-4-phenylpiperidine hydrochloride prepared as above, following the procedure of Example 11, yielded α-dl-1-(3 - methoxy - 4 - acetoxyphenethyl) - 2 - methyl - 4 - phenylpiperidine hydrochloride and β-dl-1-(3-methoxy-4-acetoxyphenethyl)-2-methyl-4-phenylpiperidine hydrochloride which melted at about 239–240° C. and 223–224° C. respectively after being twice recrystallized from a mixture of methanol and ethyl acetate.

*Analysis.*—Calculated: C, 68.38; H, 7.49; Cl. 8.78. Found: (β) C, 68.33; H, 7.44; Cl, 8.82. (α) C, 68.57; H, 7.48; Cl, 8.79.

EXAMPLE 27

*Preparation of 1-homovanillyl-4-phenylpiperidine*

Following the procedure of Example 6, 4-benzyloxy-3-methoxyphenethylamine was reacted with β-phenylglutaric anhydride to yield N-(4-benzyloxy-3-methoxyphenethyl)-β-phenylglutarimide. This compound melted at about 137–138° C. after recrystallization from anhydrous ethanol.

*Analysis.*—Calculated: C, 75.50; H, 6.34; N, 3.26. Found: C, 75.64; H, 6.05; N, 3.36.

Following the procedure of Example 6, N-(4-benzyloxy-3-methoxyphenethyl)-β-phenylglutarimide was reduced with lithium aluminum hydride to yield 1-(4-benzyloxy-3-methoxyphenethyl)-4-phenylpiperidine which was isolated as its hydrochloride salt. The hydrochloride melted at about 226–227° C. after being recrystallized three times from anhydrous ethanol.

*Analysis.*—Calculated: C, 74.03; H, 7.36; N, 3.20. Found: C, 73.78; H, 7.60; N, 3.18.

8.9 g. of 1-(4-benzyloxy-3-methoxyphenethyl)-4-phenylpiperidine hydrochloride were mixed with about 100 ml. of 6 N ethanolic hydrochloric acid. The mixture was refluxed for about six hours thus forming 1-homovanillyl-4-phenylpiperidine hydrochloride. The reaction mixture was concentrated in vacuo and the residue which contained 1-homovanillyl-4-phenylpiperidine hydrochloride was dissolved in hot anhydrous ethanol. The solution was cooled, and 10 ml. of ether were added yielding a precipitate of crystalline 1-homovanillyl-4-phenylpiperidine hydrochloride which melted at about 199–201° C. Three more recrystallizations from the same solvent mixture yielded purified 1-homovanillyl-4-phenylpiperidine hydrochloride melting at about 203–204.5° C.

*Analysis.*—Calculated: C, 69.05; H, 7.53; N, 4.03. Found: C, 68.51; H, 8.07; N, 3.83.

Acetylation of the above material by the method of Example 11 yielded 1-(3-methoxy-4-acetoxyphenethyl)-4-phenylpiperidine hydrochloride, melting at about 234–236° C.

We claim:

1. A compound of the class consisting of a substituted heterocyclic base and its pharmaceutically acceptable acid addition salts, said base being represented by the following formula:

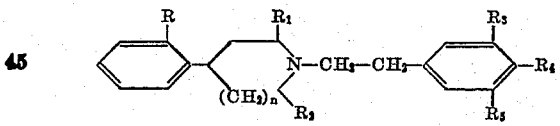

wherein $n$ is one of the cardinal numbers 0 and 1, R is chosen from the group consisting of hydrogen, methyl and methoxy, $R_1$ and $R_2$ are chosen from the group consisting of hydrogen, and lower alkyl having from 1 to 3 carbon atoms, and $R_3$, $R_4$ and $R_5$ are members of the group consisting of hydrogen, hydroxy, alkoxy, alkylenedioxy and alkanoyloxy, said alkanoyloxy group having from 1 to 4 carbon atoms, from zero to two of $R_3$, $R_4$ and $R_5$ being hydrogen.

2. α-dl-1-homoveratryl-2-methyl-4-phenylpiperidine.
3. 1 - (3 - hydroxyphenethyl)-2-methyl-4-phenylpiperidine.
4. 1-(3,4-diacetoxyphenethyl)-2-methyl-4-phenylpiperidine.
5. α-dl-1-homovanillyl-2-methyl-4-phenylpiperidine.
6. 1 - (3-methoxy-4-acetoxyphenethyl)-4-phenylpiperidine.

References Cited in the file of this patent

UNITED STATES PATENTS 2,824,111 Heinzelman _____ Feb. 18, 1958

OTHER REFERENCES

Paden: JACS, vol. 58, pp. 2487–2499 (1936).